(12) United States Patent
Kim et al.

(10) Patent No.: US 8,045,843 B2
(45) Date of Patent: Oct. 25, 2011

(54) METHOD FOR RECORDING A DIGITAL BROADCAST PROGRAM AND TIME-BASED PLAYBACK OF A RECORDED BROADCAST PROGRAM AND APPARATUS THEREFOR

(75) Inventors: Jong Soon Kim, Seoul (KR); Bang Hyun Lee, Kyunggi-do (KR)

(73) Assignee: Humax Co., Ltd, Yougin, Kyonggi-Do (KR)

( * ) Notice: Subject to any disclaimer, the term of this patent is extended or adjusted under 35 U.S.C. 154(b) by 1958 days.

(21) Appl. No.: 10/259,145

(22) Filed: Sep. 27, 2002

(65) Prior Publication Data
US 2003/0081939 A1    May 1, 2003

(30) Foreign Application Priority Data

Oct. 29, 2001 (KR) .................................... 01-66845
Nov. 13, 2001 (KR) .............................. 2001-0070561

(51) Int. Cl.
*H04N 5/917* (2006.01)
*H04N 5/95* (2006.01)
*H04N 5/932* (2006.01)
*H04N 5/783* (2006.01)
(52) U.S. Cl. ......... 386/329; 386/211; 386/216; 386/350
(58) Field of Classification Search ................... 386/111, 386/68, 69, 65, 329, 211, 216, 350
See application file for complete search history.

(56) References Cited

U.S. PATENT DOCUMENTS

| | | | | |
|---|---|---|---|---|
| 5,838,872 A | * | 11/1998 | Kawara ........................... | 386/68 |
| 5,923,811 A | | 7/1999 | Kawamura et al. | |
| 6,212,330 B1 | | 4/2001 | Yamamoto et al. | |
| 6,483,945 B1 | * | 11/2002 | Kato .............................. | 382/236 |
| 6,823,010 B1 | * | 11/2004 | Curet et al. .............. | 375/240.12 |
| 6,920,178 B1 | * | 7/2005 | Curet et al. .............. | 375/240.14 |
| 6,993,248 B1 | * | 1/2006 | Kato .............................. | 386/69 |
| 7,106,749 B1 | | 9/2006 | Darshan et al. | |
| 2001/0026561 A1 | | 10/2001 | Morris et al. | |
| 2002/0064371 A1 | * | 5/2002 | Seo et al. ......................... | 386/68 |
| 2004/0126097 A1 | * | 7/2004 | Aridome ......................... | 386/98 |

(Continued)

FOREIGN PATENT DOCUMENTS

CN        1268746 A       10/2000

(Continued)

OTHER PUBLICATIONS

European Search Report [EP02020823] dated Mar. 14, 2003.

(Continued)

*Primary Examiner* — Helen Shibru
(74) *Attorney, Agent, or Firm* — Perman & Green, LLP

(57) ABSTRACT

A method and apparatus for receiving and recording a digital broadcast program and reproducing a recorded digital broadcast program with time-based trick play features. While recording a broadcast program on a storage medium, the apparatus creates an index file regarding random access points of the program. Receiving a request for a jump or trick play operation given in terms of time, the apparatus detects the time interval between each of the random access points based on the created file. Referring to the time interval, the apparatus determines the position to be reached by the jump and begins playback from the position or determines the number of access points to be skipped for the trick play and begins the requested trick play by skipping random access points by the number, thereby providing a user-friendly interface having time-based trick play features.

9 Claims, 6 Drawing Sheets

U.S. PATENT DOCUMENTS

2006/0098953 A1* 5/2006 Nagasawa ..................... 386/111

FOREIGN PATENT DOCUMENTS

| EP | 07927200 | A2 | 9/1997 |
| EP | 1043892 | A1 | 10/2000 |
| JP | 2001086431 | A | 3/2001 |
| JP | 2001111943 | B2 | 4/2001 |
| WO | 0135669 | A1 | 5/2001 |
| WO | 0176256 | A1 | 10/2001 |

OTHER PUBLICATIONS

European Search Report [EP02020823] dated May 30, 2003.

\* cited by examiner

Conventional Art

METHOD FOR RECORDING A DIGITAL BROADCAST PROGRAM AND TIME-BASED PLAYBACK OF A RECORDED BROADCAST PROGRAM AND APPARATUS THEREFOR

BACKGROUND OF THE INVENTION

1. Field of the Invention

The present invention relates to a method and apparatus for recording a received digital broadcast program while playing the received program and for performing normal playback or time-based trick play of a recorded digital program.

2. Description of the Related Art

With remarkable advancements in digital signal processing, Moving Picture Experts Group (MPEG) audio/video coding standard has emerged as a major technique for the transport of digital audio/video data such as movies. Along with the MPEG standard, the development of digital communication techniques have enabled digital broadcasts. The transitions from analog to digital broadcasts are presently underway based upon the MPEG standard in terrestrial, satellite, and cable broadcasts industries.

Digital broadcasts offer many advantages over its analog counterparts, which include superior audio/video quality for a given bandwidth, smaller bandwidth for a given image resolution, compatibility with computers and storage media, simultaneous broadcasts of multiple programs in a single channel, etc.

In digital broadcasts, a multitude of programs compressed according to the MPEG standard are multiplexed into a single transport stream comprising a series of transport packets (TPs) and transmitted in the form of a transport stream. A single transport stream transmitted through an RF channel, therefore, may contain a multitude of programs or sub-channels. A broadcast receiver at a viewer's location receives transmitted broadcast signals. If a program is selected, the receiver demultiplexes a transport stream containing the selected program and decodes TPs associated with the program, thereby retrieves video/audio signals of the selected program to be presented by a TV connected to the receiver.

Digital set-top box manufacturers recently started releasing more sophisticated set-top boxes with recording capability. Such a set-top box contains a hard disk drive with a high storage capacity within it and is capable of recording a selected broadcast program on the hard disk drive, simultaneously playing the selected program. The recorded program can be played at anytime by a user's command.

If the received program is merely recorded as received, time-based skipping features are not available with the set-top box because the recorded program does not include information for time-based trick play operations. In order to locate a specific position in the recorded program, therefore, a user should perform repeated trick play operations such as fast forward or fast rewind until the position is located.

Fast forward or fast reverse playback of a recorded program is commonly implemented using I-pictures. The number of presented I-pictures, however, is to some extent independent of the time duration of the trick play because I-pictures are not located at regular intervals. In this respect, such picture-based search modes are not convenient for users who are familiar with time-based search modes.

Therefore, there is a need for an improved method for recording a received broadcast program which facilitates time-based trick play of the recorded program.

SUMMARY OF THE INVENTION

The object of the present invention is to provide a method and apparatus for recording a digital broadcast program on a storage medium for playback and reproducing a recorded program with time-based trick play features.

A method for recording a digital broadcast program in accordance with an embodiment of the present invention comprises the steps of selecting a program from received digital broadcasts, recording packets constituting the selected program on a storage medium, simultaneously decoding and outputting the packets, and detecting access points contained in the packets and storing the position index of each of the access points in a file.

A method for reproducing a digital broadcast program in accordance with an embodiment of the present invention comprises the steps of receiving a position in terms of time to be reached by a jump from the present position in a broadcast program being recorded, detecting the position index of an access point corresponding to the received position based on position index of each of access points and a presentation time interval between successive ones of the access points stored for the broadcast program, and decoding and outputting packets starting from a packet pointed to by the detected position index or a packet near the pointed packet.

Another method for reproducing a digital broadcast program in accordance with another embodiment of the present invention comprises the steps of receiving a desired speed for playback of a recorded program, determining the number of position indices of access points to be skipped to obtain the desired speed based on the set of position indices of the access points and a presentation time interval between successive ones of the access points stored for the recorded program, and repeating the task of selecting a position index after skipping the determined number of following position indices, and decoding and outputting a picture from a packet pointed to by the selected position index or a packet near the pointed packet.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

To begin with, a method for recording a digital broadcast program in accordance with an embodiment of the present invention will be described.

Figure 1:
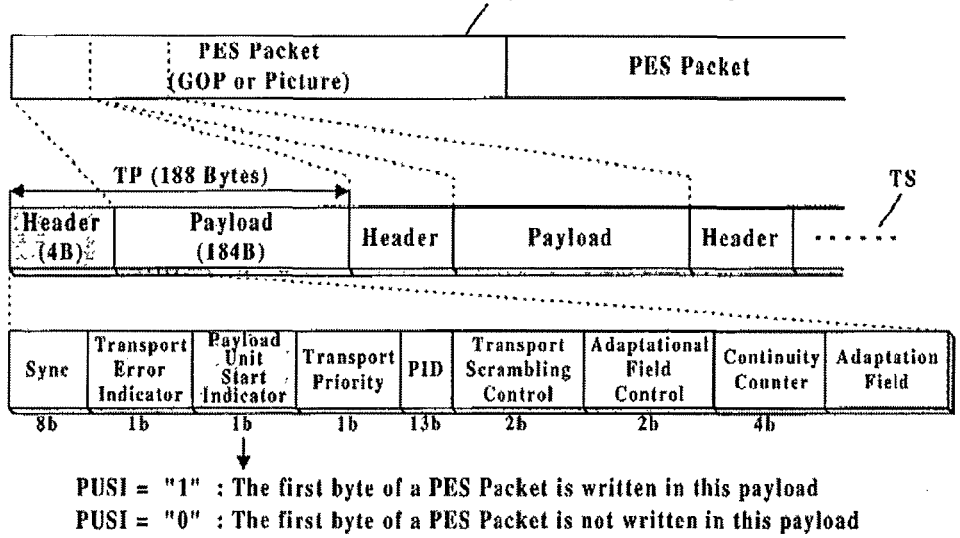
FIG. 1 is a schematic diagram of the structure of an MPEG transport packet (TP)

For recording a received broadcast program on a hard disk drive, a set-top box embodying the present invention monitors each of incoming TPs to detect its payload unit start indicator (PUSI). A TP includes a 4-byte header followed by a payload and the PUSI is a 1-bit flag contained in the header as shown in FIG. 1. Each TP is fixed in length at 188 bytes or 204 bytes depending on broadcasting formats.

The PUSI has the following significance: a '1' indicates that the payload of this TP will commence with the first byte of a PES (Packetized Elementary Stream) packet and a '0' indicates no PES packet shall start in this TP. If the PUSI is set to '1', then one and only one PES packet starts in this TP.

A PES packet may encapsulate a single coded video picture (I-picture, P-picture, or B-picture) or a group of pictures (GOP). A GOP is composed of one or more I-pictures and additional different types of pictures and an I-picture is always encoded first within the GOP. A TP the PUSI of which is set to '1', therefore, always carries the leading byte of a coded picture.

The picture type that a PES packet represents remains unchanged within a program. In other words, if an arbitrary PES packet of a program encapsulates a GOP, it implies that a PES packet corresponds to a GOP throughout the program.

Figure 2:
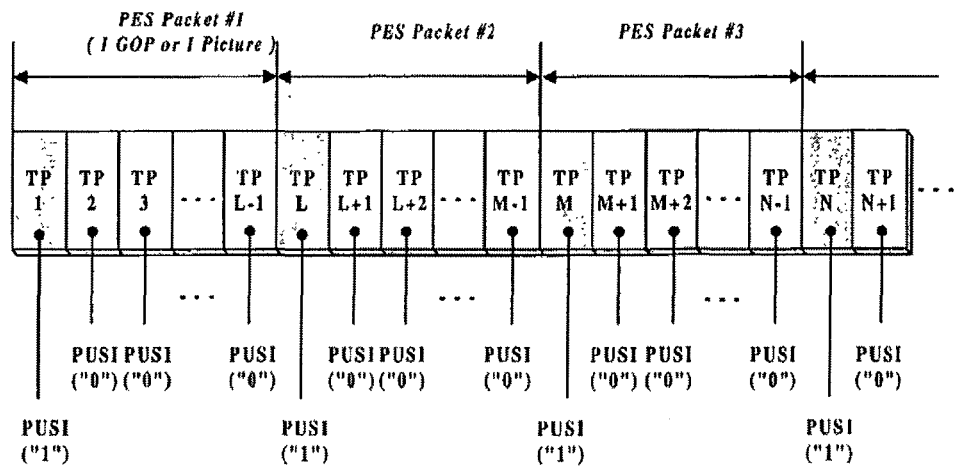
FIG. 2 is a schematic diagram showing the relation between PES packets and transport packets (TPs) encapsulating the PES packets.

FIG. 2 depicts the relation between PES packets and TPs, wherein a single PES packet spans many TPs. Since TP 1 contains the first byte of PES packet #1 encapsulating a picture (field or frame) or a GOP, the PUSI in the header of TP 1 is set to '1'. Likewise, the PUSIs of TP 1, TP m, and TP n are all set to '1'

As a rule a PES packet encapsulating a GOP is longer than a PES packet encapsulating a picture. In other words, a GOP-based PES packet spans more TPs than a picture-based PES packet; therefore the time interval between two successive GOP-based PES packets is larger than the time interval between two successive picture-based PES packets. As a result, time intervals between successive TPs having the PUSI set to '1' fall statistically into two groups according to the type of access units that corresponding PES packets encapsulates. This means that the type of an access unit that a PES packet encapsulates can be determined by the time interval between the PES packet and the next one.

Each time a TP having the PUSI set to '1' is received, the set-top box stores the amount of data or time interval between the TP and the previous one. In addition the set-top box stores the position of the TP on the hard disk drive in a file as index information. Since the type of an access unit that a PES packet encapsulates can be determined as mentioned above, the determined type is also stored in the index file as additional indication information or the index file is given a file name indicative of the determined type.

For example, if the average of time intervals or amounts of data between successive ones of TPs having the PUSI set to '1' is larger than a predefined threshold value, it is concluded that the index information indicates the start positions of GOPs on the hard disk drive. Then the index file is named 'G_Index.xx' to indicate that the file is related to positions of GOPs. Otherwise, the index information is named 'P_Index.xx' to indicate that the file is related to positions of pictures.

In the case where a PES packet encapsulates a picture instead of a GOP, the further specific picture type of the PES packet can be determined in a similar way because the size of a picture varies according to its type (I-picture, P-picture, or B-picture). For instance, a PES packet encapsulating an I-picture is generally larger than a PES packet encapsulating a P-picture or B-picture. Therefore, the specific picture type of a picture-based PES packet can be determined by the time interval between the TP containing the first byte of the PES packet and the TP containing the first byte of the next PES packet.

After detecting the specific picture type of each pictured-based PES packet, the set-top box stores the detected picture type in the index file by coupling the type to the corresponding index information.

Figure 3:
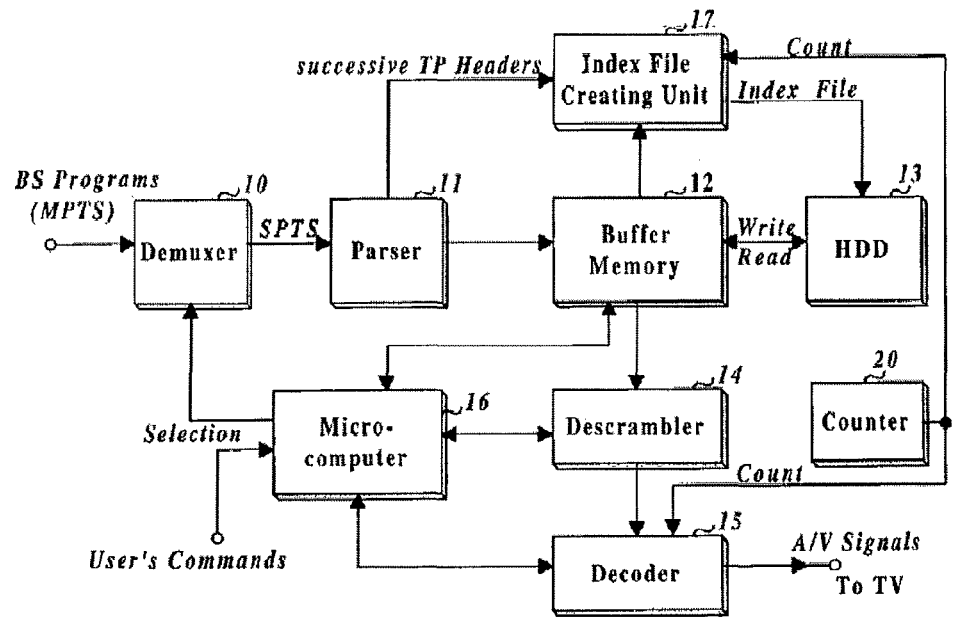
FIG. 3 is a block diagram of a digital broadcast receiver in accordance with an embodiment of the present invention.
Figure 4:
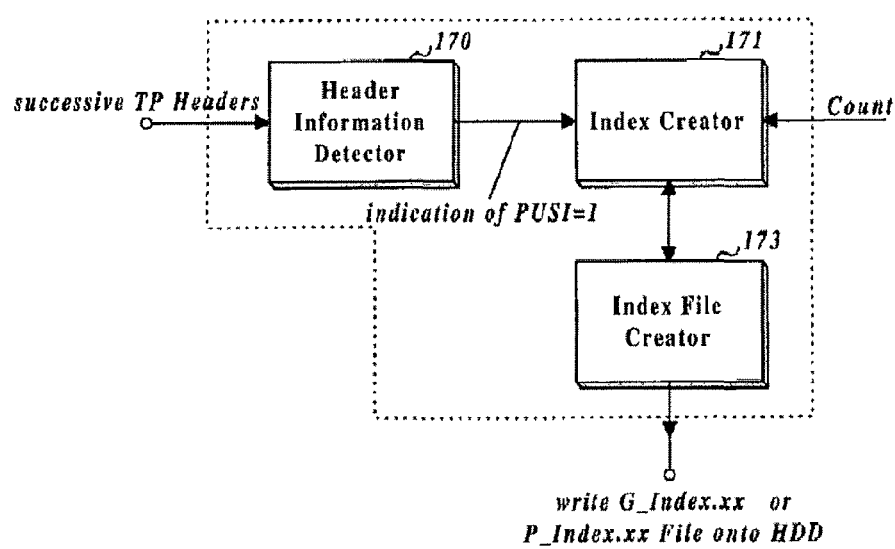
FIG. 4 is a detailed block diagram of an index file creating unit in FIG. 3.

FIG. 3 shows a block diagram of a set-top box in accordance with an embodiment of the present invention. The set-top box comprises a demultiplexer 10, a parser 11, a hard disk drive 13, a buffer memory 12, a descrambler 14, a decoder 15, an index file creating unit 17, a counter 20, and a microcomputer 16. The demultiplexer 10 demultiplexes a received multi-program transport stream (MPTS) to produce a single-program transport stream (SPTS) of a selected program. The parser 11 outputs the header of each of the TPs constituting the SPTS produced by the demultiplexer 10. The buffer memory 12 temporarily stores TPs to be recorded on the hard disk drive 13. If the TPs stored in the buffer memory 12 contains scrambled data, the descrambler 14 descrambles the TPs to yield unscrambled data. The decoder 15 decodes the output of the descrambler 14 and thereby retrieves video and audio data of the selected program. The index file creating unit 17 creates an index file for random access of the program recorded on the hard disk drive 13. The counter 20 counts an internal system clock of a predefined frequency. The microcomputer 16 controls each component of the set-top box to perform requested recording or playback operations.

Assumed to have a storage capacity of 40 GB, the hard disk drive 13 theoretically can hold 330 minutes length of MPEG transport streams received at a rate of 16 Mbps.

The index file created by the index file creating unit 17 is also recorded along with the associated MPEG transport stream on the hard disk drive 13.

The index file creating unit 17 further comprises a header information detector 170, an index creator 171, and an index file creator 173. The header information detector 170 monitors the headers received from the parser 11 and outputs an indication signal when detecting a TP having the PUSI set to '1'. The index creator 171 responsive to the indication signal creates index information containing the position of the TP in the received program and a time count indicating the receiving time of the TP. After detecting the type of an access unit with which the index information file is associated, the index file creator 173 records the created index information in a file having a name indicative of the type.

The header information detector 170 monitors the received headers and outputs an indication signal to the index creator 171 each time a TP having the PUSI set to '1' is detected. The index creator 171 responsive to the indication signal calculates the relative position of the TP stored in the buffer memory 12, that is, the position of the TP in the program being recorded on the hard disk drive 13. For the calculation, the index creator 171 keeps counting the number of TPs sequentially stored in the buffer memory 12.

If a certain TP having the PUSI set to '1' is the nth TP of a program being recorded, then the first byte of the TP is the (n−1)×188th (or (n−1)×204th) byte in the program. The calculated position is stored in a predetermined location of an internal memory or the buffer memory 12. The content of the counter 20 indicating the receiving time of the TP is also recorded along with the position. The index creator 171 repeats this process each time it receives an indication signal from the header information detector 170.

Figure 5:
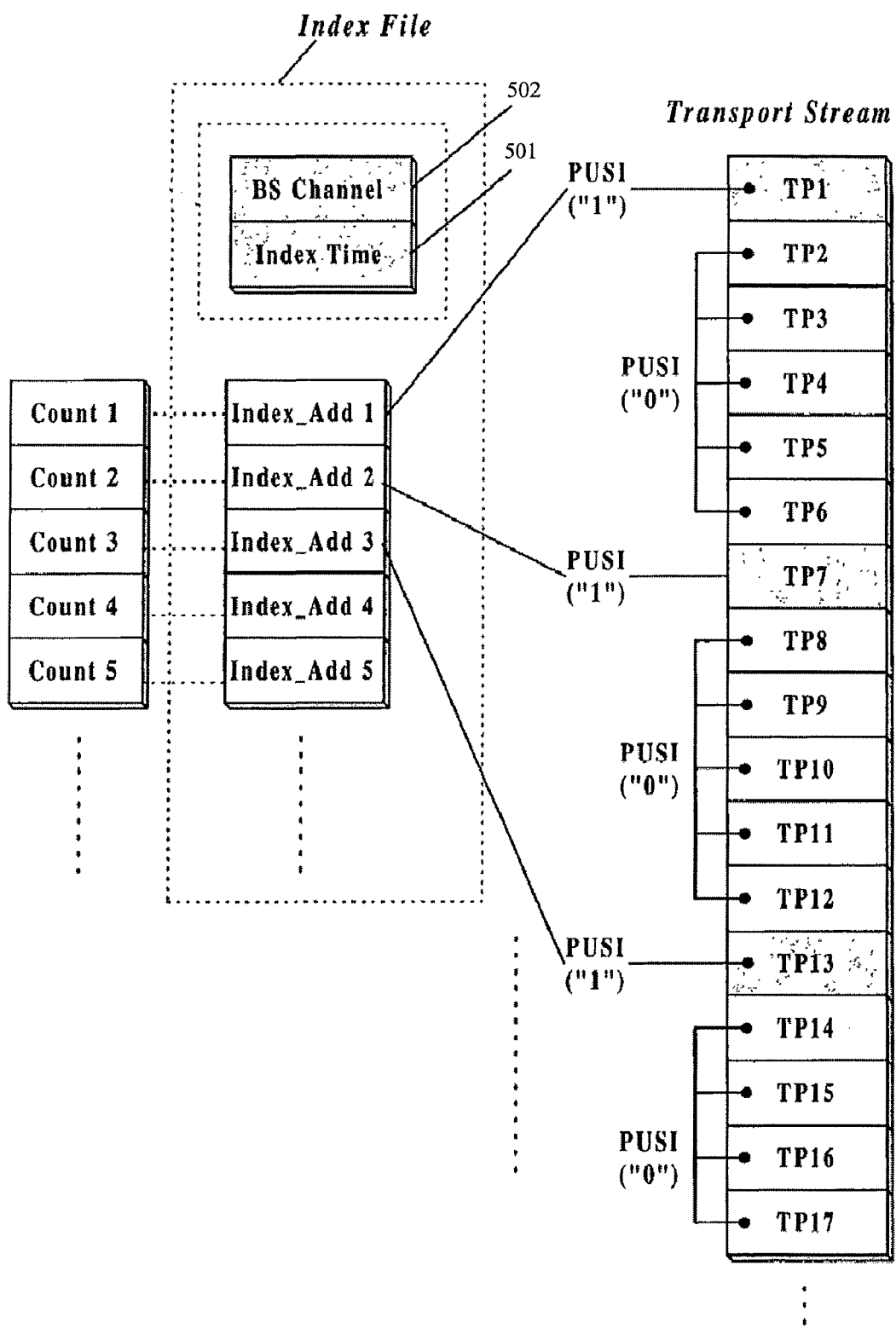
FIG. 5 is a schematic diagram showing how an index file is created in accordance with the present invention.

FIG. 5 shows how the index information is created. Since TP 1, TP 7, and TP 13 are the TPs having the PUSIs set to '1', the position (Index_Add k) and counter value (Count k) for each of the TPs is stored. In this example, Index_Add 1, Index_Add 2, and Index_Add 3 are 0×188 (0×204), 6×188 (6×204), and 12×188 (12×204), respectively.

Figure 6:
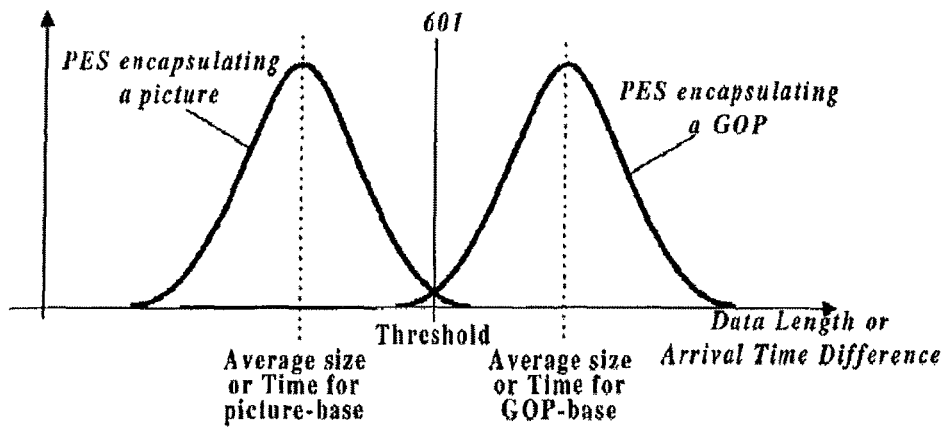
FIG. 6 is a graph showing a statistical distribution of amounts of data between successive ones of access points.

After a predefined time passes from start of the recording, the index file creator 173 takes an average of the differences between successive ones of the stored count values or index values. FIG. 6 shows a statistical distribution of the differences. The obtained average is compared to a predefined reference 601, for example, 150 Kbytes.

If the average exceeds the reference value 601, the index file creator 173 concludes that the index information is position information for random access of GOPs. Otherwise, the index file creator 173 concludes that the index information is position information for random access of pictures.

In the latter case, the index file creator 173 detects the detailed picture type to which each index refers. Two reference values, for example Th_H and Th_L, are defined and each of the differences between successive ones of the index values is compared to the reference values. The decision is made as follows. If a difference is greater than Th_H, the corresponding index is associated with an I-picture. If the difference is less than the Th_L, the index is associated with a B-picture. Otherwise, the index is associated with a P-picture. The determined picture type is added to the corresponding index entry.

Then the index file creator 173 creates an index file to store the index information with the detailed type of each picture. The file is named 'P_Index.xx' to indicate that the index file is associated with positions of pictures instead of GOPs. The created file is recorded on the hard disk drive 13.

Once an index file is created, new index information can be added to the index file as soon as it is created or can be temporarily stored in the buffer memory 12 before added to the index file.

If the index information is associated with the positions of GOPs, the index file is named 'G_Index.xx' to indicate that it is related to the positions of GOPs and recorded on the hard disk drive 13.

Instead of giving different names for index files associated with different picture types, the index information can be stored in a file, for example Index.xx', without regard to picture types with additional information for discriminating groups of index information.

The index file creator 173, after detecting the type of access units with which the index file is associated, sets an index time accordingly. If each index interval corresponds to a picture, the index time 501 is set to ¹⁄₂₅ (PAL) or ¹⁄₃₀ (NTSC).

If each index interval corresponds to a GOP, the index file creator 173 inquires the number of pictures constituting a GOP of the microcomputer 16. Then the microcomputer 16 executes a decoding program to retrieve TPs belonging to an interval into a GOP layer and identifies the number of pictures contained in the GOP from the header information.

Although a GOP generally comprises 12 pictures, the number of pictures varies depending on broadcasters. The identified number of pictures N is sent to the index file creator 173. Receiving the number N, the index file creator 173 multiplies the number N by ¹⁄₂₅ (PAL) or ¹⁄₃₀ (NTSC) and sets the multiplication result as the index time 501.

The index creator 171 may also record channel information 502 pertaining to the program being recorded. As shown in FIG. 5, the channel information 502 and index time 501 are recorded in the index file.

If a channel change or program change takes place during the creation and recording of index information, the microcomputer notifies the index file creator 173 of the change.

On receipt of the notice, the index file creator 173 begins to create index information concerning the new program, calculates a new index time, and records the new index time along with new channel information. The information about the new program can be stored in the same file containing the information of the previous program or in a separate file. If the same file is used, additional indication information to distinguish groups of index entries is recorded.

Meanwhile, TPs that are being recorded on the hard disk drive 13 via the buffer memory 12 are provided to the decoder 15 unless encrypted. If encrypted, the encrypted TPs are first descrambled by the descrambler 14 and then decoded by the decoder 15.

The decoder 15 retrieves PES packets from the input TPs, locates the PTS (Presentation Time Stamp) contained in the header of each PES packet, decodes the PES packets, and outputs audio/video data, synchronizing the PTS of each TP to the system clock counted by the counter 20.

A method for reproducing a recorded digital broadcast program using an index file created when the program was recorded in accordance with the present invention will now be described.

Figure 7:
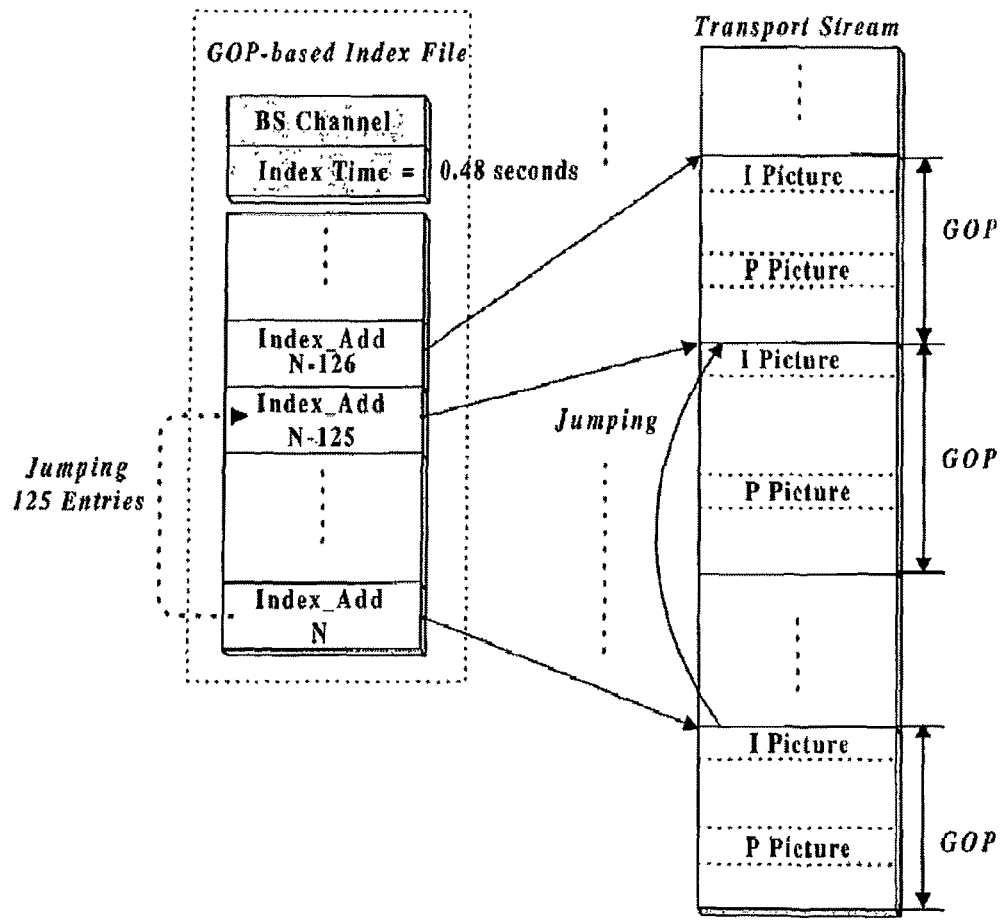
FIGS. 7 and 8 are schematic diagrams of exemplary index files to show how time-based jump operations are implemented in accordance with an embodiment of the present invention.

Suppose that a broadcast program is recorded on the hard disk drive 13 along with a GOP-based index file named 'G_Index.xx' created in accordance with the aforementioned recording method. FIG. 7 shows the content of the index file.

Receiving, during recording and outputting of a received program, a time-based jump request, for example a backward jump by 1 minute, the microcomputer 16 calculates how many backward jumps of index entries from the index entry corresponding to the presently played scene locates the index entry associated with the requested 1-minute backward jump. Suppose that a GOP is composed of 12 pictures and the index time is 0.48 (=12/15) second because the broadcast format is PAL. In this case, the 125th index entry from the current one points to the position of the first data of the requested video on the hard disk drive 13. Decoding TPs from the position, therefore, provides the requested replay.

Figure 8:
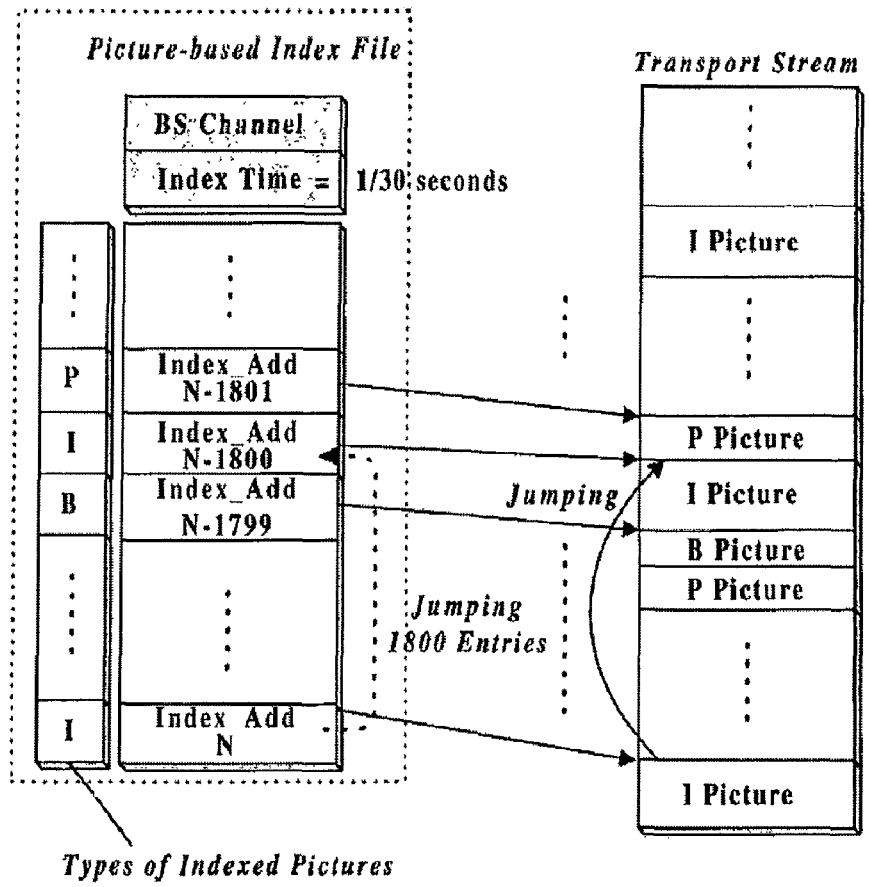

FIG. 8 shows the content of another exemplary index file named 'P_Index.xx'. As the name implies, it is a picture-based index file and thus it contains the type of each indexed picture as well. The index time in this case is ¹⁄₃₀ second by assuming the broadcast format is NTSC.

If a request to jump backward by 1 minute is received, the microcomputer 16 determines the index entry corresponding to the requested position to be reached using the index time in the index file. Since the index time in this case is ¹⁄₃₀ second, the index entry corresponding to the requested position is the 1800th index entry backward from the index entry corresponding to the presently played picture. That is, if the present index entry is the Nth one, then the wanted one is the (N−1800)th index entry.

The microcomputer 16 then checks the type of an access unit pointed to by the (N−1800)th index entry. If it is an I-picture, the microcomputer 16 begins decoding of TPs from the position to which the index entry points. Otherwise, the microcomputer 16 searches for the nearest index entry pointing to an I-picture and begins decoding of TPs from the position to which the searched index entry points.

The use of the index file makes trick play features such as fast or slow playback operations available as well as the aforementioned time-based jump operations.

A 24 times speed playback, for example, needs decoding of I-pictures positioned at intervals of 0.96 (=24/25) second for PAL or 0.8 (=24/30) second for NTSC with skipping intermediate pictures. Therefore, if a user requests a forward or reverse 24 times speed playback of the recorded program in FIG. 7, the microcomputer 16 decodes and outputs the first I-picture of the GOP to which every other index entry points. Meanwhile, in the case of FIG. 8 the microcomputer 16 repeats the process of decoding an I-picture associated with an index entry, skipping the next 23 index entries, and decoding the picture associated with the 24th index entry from the previous one. In the event where the picture associated with a selected index entry is not an I-picture, the nearest index entry pointing to an I-picture is located and the corresponding I-picture is decoded.

Figure 9A:
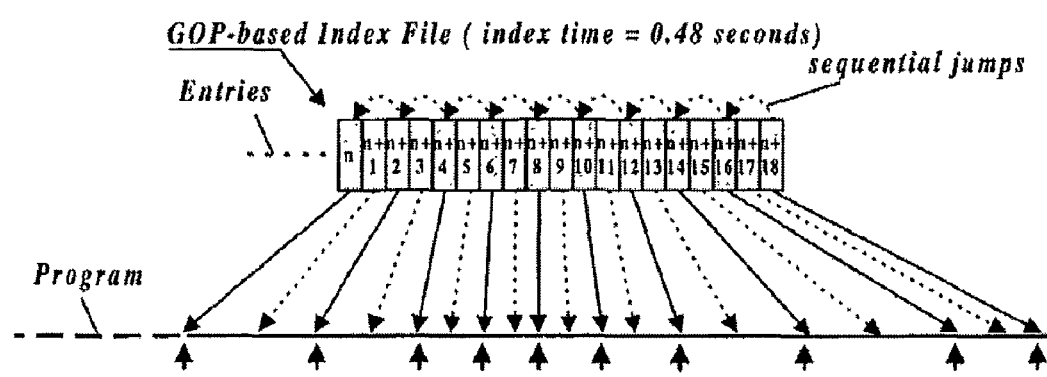
FIGS. 9a and 9b are schematic diagrams to show how time-based trick play operations are implemented in accordance with an embodiment of the present invention.
Figure 9B:
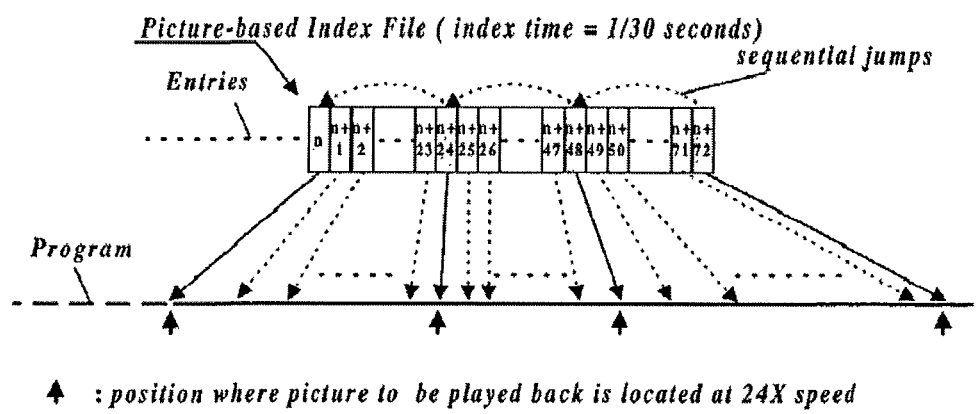

Playback at any speeds other than the standard playback speed can be implemented in a similar manner. FIGS. 9a and 9b show examples of index skipping for the above-mentioned 24 times speed playback operations.

If none of the index entries are skipped and the first picture of every GOP is decoded in the example of FIG. 7, playback at 12 times speed is implemented. As a result, if a playback at a speed lower than 12 times speed, for example 6× speed, is selected, the microcomputer 16 needs to decodes another P-picture as well as the leading I-picture of each GOP.

Such searching and decoding of I-pictures and P-pictures can be accomplished by setting an adequate scanning mode to the decoder 15.

Now that the example in FIG. 8 refers to a picture-based index file, trick play modes at multiple speeds in forward and reverse directions can be easily implemented by the index skipping method. If playback at a speed lower than the standard speed is selected, the presentation time duration of the picture to which each index entry points is extended. For instance, if a ½× speed playback is selected, the presentation time duration of each picture is extended to 2/30 second, double the normal presentation time duration. Such a trick play can be also implemented by lowering the pumping rate of applying TPs to the decoder 15.

Figure 10:
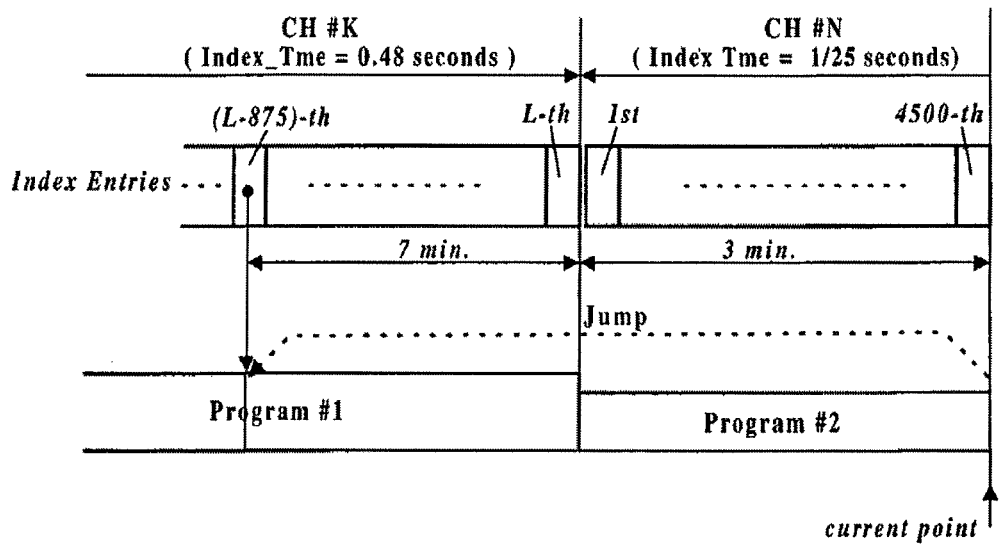
FIG. 10 is a schematic diagram to show how a jump to another program is implemented in accordance with an embodiment of the present invention.

A requested time-based backward jump may result in a previously recorded program. In the example of FIG. 10, the present program CH #N occupies only 3-minute amount of data. In this case, if a backward jump by 10 minutes is selected, the microcomputer 16 calculates the time duration of the present program and fails to locate the requested position within the program. Then, the microcomputer 16 checks the index entries and index time of the previous program CH #K stored in the same index file or in a separate index file. Based on the index time, the microcomputer 16 searches for the index entry of the previous program corresponding to the backward jump by the remaining 7 minutes.

The index file for the previous program CH #K is a GOP-based one and the index time is 0.48 second. Meanwhile, the index file for the present program CH #N is a picture-based one and the corresponding index time is 1/30 second. Since the present program has been recorded only for 3 minutes, the index file contains no more than 4500 entries. The microcomputer 16, therefore, searches for the 875th (=420/0.48) index entry (IE #(L-875)) backward from the last index entry (IE #L) of the previous program and begins decoding TPs from the position to which the searched index entry points, thereby starting the requested backward jump.

If the index file for the previous program is a picture-based one, then the microcomputer 16 checks the type of the picture pointed to by a searched index entry. Unless it is an I-picture, the microcomputer 16 searches the nearest index entry pointing to an I-picture and begins decoding of TPs from the picture pointed to by the nearest index entry.

The preferred embodiments have assumed so far that each of index entries points to the start position of a TP within a program. The invention, however, can be also embodied such that each index entry points to the end position of a TP within the program. Also, in the above embodiments, the index time used for locating a wanted position in a recorded program is calculated and stored when the program is recorded. But the index time can be calculated in real time by analyzing TPs stored in the buffer memory 12 when a trick play is performed.

The method and apparatus in accordance with the invention provides a user-friendly interface for a digital broadcast receiver that enables time-based trick play operations.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for recording a digital broadcast program, comprising the steps of:
    (a) selecting a program composed of packets from received digital broadcast programs;
    (b) recording said selected program onto a storage medium;
    (c) detecting data access points contained in said packets, determining whether each interval between successive data access points corresponds to a picture or an MPEG-defined GOP (Group of Pictures) based on an average of time intervals or amounts of data between successive data access points, and calculating an index time between successive data access points based on a result of the determination; and
    (d) storing each position index of said data access points in a file, wherein said step (d) includes adding the calculated index time in said file.

2. The method set forth in claim 1, wherein said step (c) detects said data access points based on a flag included in a header of each packet being recorded, the flag indicating start of an MPEG-defined PES (Packetized Elementary Stream) packet.

3. The method set forth in claim 1, wherein an interval between successive data access points corresponds to a field or a frame.

4. The method set forth in claim 1, wherein said step (d), if said interval corresponds to a picture, stores additional information indicative of a type of each data unit that corresponds to the interval between adjacent two data access points in association with each position index of the related data access point, the type being either an I-picture or a non-I-picture.

5. The method set forth in claim 1, wherein said step (c) detects the number of pictures contained in a GOP by decoding the GOP and calculates said index time based on the detected number, if each interval between successive data access points corresponds to a GOP.

6. The method set forth in claim 1, wherein said step (d) names the file differently based on whether the data access point is inserted every picture or every MPEG-defined GOP.

7. An apparatus for receiving a digital broadcast program, comprising:
- selecting unit configured to select a program from received digital broadcast programs;
- decoding unit configured to decode and output packets constituting said selected program;
- recording unit configured to record packets constituting said selected program on a storage medium; and
- search information creating unit configured to detect data access points contained in said packets, to determine whether each interval between successive data access points corresponds to a picture or an MPEG-defined GOP based on an average of time intervals or amounts of data between successive data access points, to calculate an index time between successive data access points based on a result of the determination, and to record each position index of the detected data access points and the calculated index time in a file.

8. The apparatus set forth in claim 7, wherein said search information creating unit detects the data access points based on a flag included in a header of each packet being recorded, the flag indicating start of a MPEG-defined PES packet.

9. The apparatus set forth in claim 7, wherein said search information creating unit detects the number of pictures contained in a GOP by decoding the GOP and calculates a presentation time interval between successive ones of said access points based on the detected number, if each interval between successive data access points corresponds to a GOP.

* * * * *